US008789177B1

(12) United States Patent
Johnston et al.

(10) Patent No.: US 8,789,177 B1
(45) Date of Patent: Jul. 22, 2014

(54) METHOD AND SYSTEM FOR AUTOMATICALLY OBTAINING WEB PAGE CONTENT IN THE PRESENCE OF REDIRECTS

(75) Inventors: Nicholas Johnston, Cheltenham (GB); Graham Coomer, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 199 days.

(21) Appl. No.: 13/083,935

(22) Filed: Apr. 11, 2011

(51) Int. Cl.
*G06F 21/51* (2013.01)

(52) U.S. Cl.
USPC ............... 726/22; 726/23; 726/10; 726/11; 726/12; 726/13

(58) Field of Classification Search
USPC .......................................................... 726/22
See application file for complete search history.

(56) References Cited

U.S. PATENT DOCUMENTS

| 7,343,626 | B1 | 3/2008 | Gallagher |
| 7,797,421 | B1* | 9/2010 | Scofield et al. ............. 709/224 |
| 7,886,352 | B2* | 2/2011 | Pandrangi et al. ............ 726/12 |
| 7,917,655 | B1* | 3/2011 | Coomer et al. ............. 709/248 |
| 8,051,465 | B1* | 11/2011 | Martin et al. ................. 726/3 |
| 8,255,572 | B1* | 8/2012 | Coomer ...................... 709/248 |
| 8,353,035 | B1* | 1/2013 | Coomer et al. ............... 726/22 |
| 2006/0224677 | A1 | 10/2006 | Ishikawa et al. |
| 2007/0016949 | A1 | 1/2007 | Dunagan et al. |
| 2007/0261112 | A1* | 11/2007 | Todd et al. ................. 726/11 |
| 2008/0250159 | A1* | 10/2008 | Wang et al. ................. 709/239 |
| 2008/0313728 | A1* | 12/2008 | Pandrangi et al. ............ 726/12 |
| 2009/0037997 | A1* | 2/2009 | Agbabian et al. ............ 726/10 |
| 2011/0030060 | A1 | 2/2011 | Kejriwal |
| 2011/0145435 | A1* | 6/2011 | Bhatawdekar et al. ........ 709/238 |
| 2011/0191849 | A1* | 8/2011 | Jayaraman et al. ............ 726/23 |
| 2012/0210011 | A1* | 8/2012 | Liu et al. ................... 709/229 |

OTHER PUBLICATIONS

"A Taxonomy of JavaScript Redirection Spam" by Chellapilla, 2007.*
Chellapilla, "A Taxonomy of JavaScript Redirection Spam", 2007.*
Chellapilla et al, "A Taxonomy of JavaScript Redirection Spam", Published 2007, pp. 1-8.*
Johnston et al., "Method and System for Automatically Obtaining Web Page Content in the Presence of Javascript," U.S. Appl. No. 13/454,725, filed Apr. 24, 2012.

(Continued)

*Primary Examiner* — Kambiz Zand
*Assistant Examiner* — Yonas Bayou
(74) *Attorney, Agent, or Firm* — Wilmer Cutler Pickering Hale and Dorr LLP

(57) ABSTRACT

A method and apparatus for automatically obtaining web page content in the presence of redirects whereby an incoming message is received and analyzed to determine if the message contains any URLs. Any detected URLs are then extracted and activated to analyze the contents of the web page linked to by the URL. The HTTP response headers and content sent from a web page server in response to the browser HTTP requests to activate the URL link are analyzed to determine if the response includes a redirect to a new, or destination, URL, and associated web page, i.e., to determine if the detected URLs result in redirects. If the HTTP response indicates a redirect, a URL redirect analysis process is initiated that includes a set of redirect processing procedures that are selectively applied depending on the type of redirect encountered, and each redirect is automatically followed. For chains of redirects, the process is recursive, i.e., is repeated automatically for each redirect, from the beginning, and as if the new (destination) URL is itself an original URL.

20 Claims, 3 Drawing Sheets

(56) References Cited

OTHER PUBLICATIONS

Chellapilla et al., "A Taxonomy of JavaScript Redirection Spam," *AIRWeb '07*, May 8, 2007, 8 pages, ACM, Alberta, Canada.

Nichols et al., "Simple & basic form spam reduction: checking for Javascript?" *Stack Overflow*, Sep. 9, 2008, 3 pages [online]. Retrieved on Jul. 9, 2012 from URL: http://stackoverflow.com/questions/52359/simple-basic-form-spam-reduction-checking-for-javascript.

Pradhan, "'Really cool Facebook revolving images' is a Spam," *Terabug*, Nov. 23, 2010, 6 pages [online]. Retrieved on Jul. 9, 2012 from URL: http://www.terabug.com/facebook-revolving-images-is-a-spam/.

Richardson, "Google's Matt Cutts and JavaScript Redirects," *WebProNews*, Aug. 19, 2005, 5 pages [online]. Retrieved on Jul. 9, 2012 from URL: http://www.webpronews.com/googles-matt-cutts-and-javascript-redirects-2005-08.

Rozell, "No-Spam E-mail," *JavaScript Source*, May 16, 2002, 7 pages [online]. Retrieved on Jul. 9, 2012 from URL: http://www.javascriptsource.com/miscellaneous/no-spam-e-mail.html.

Slawski, "Microsoft on Javascript Redirection Spam," *SEO by the Sea*, Sep. 24, 2007, 3 pages [online]. Retrieved on Jul. 9, 2012 from URL: http://www.seobythesea.com/2007/09/microsoft-on-javascript-redirection-spam/.

Wang, "Web Spam Detection for Heritrix," 2008, 17 pages, Retrieved on Jul. 9, 2012 from URL: https://webarchive.jira.com/wiki/exportword?pageId=5484.

No author provided, "Javascript spam," *Staffblog*, 3 pages [online]. Retrieved on Jul. 9, 2012 from URL: http://blog.freenode.net/2010/01/javascript-spam/.

No author provided, "Stop Spammer Email Harvesters by Inserting Addresses with JavaScript or CSS," *Nadeau Software*, May 4, 2007, 7 pages [online]. Retrieved on Jul. 31, 2012 from URL: http://nadeausoftware.com/articles/2007/05/stop_spammer_email_harvesters_inserting_addresses_with_javascript_or_css.

Ortner, Robert et al., "Redirect Back to the Space where the User Comes From," *Atlassian Forums*, Apr. 8, 2008, 3 pages [online], Retrieved on Sep. 2, 2011 from URL: http://forums.atlassian.com/message.jspa?messageID=257280526.

Ream, J. "ASP Response.Redirect Recursive Limit IIS7?" *Experts Exchange*, 1 page [online], Retrieved on Sep. 2, 2011, from URL: http://www.experts-exchange.com/Web_Development/Web_Languages-Standars/ASP/Q_25388628.html.

No author provided, "FlashGot Changelog", *FlashGot*, 23 pages [online], Retrieved on Sep. 2, 2011 from URL: http://flashgot.net/changelog.

No author provided, "Redirecting Spambots", *Spam Links*, 2 pages [online], Retrieved on Sep. 2, 2011 from URL: http://spamlinks.net/prevent-spambots-redirect.htm.

No author provided, "URL Redirection," *Wikipedia*, 12 pages [online], Retrieved on Sep. 2, 2011 from URL: http//en.wikipedia.org/wiki/URL_redirection.

Vicario, "Spammers Abuse Free Hosting Sites with JavaScript Redirects", posted on behalf of Nicholas Johnston, blogs form Symantec.com, Dec. 2010, 4 pages.

Messmer, "Barracuda gobbles up SaaS security start-up Purewire", Network World, 2009, 2 pages.

Barracuda, "Purewire Web Security Service Cloud-based Content Filtering and Malware Protection", Barracuda Networks Inc., 2010, 2 pages.

\* cited by examiner

METHOD AND SYSTEM FOR AUTOMATICALLY OBTAINING WEB PAGE CONTENT IN THE PRESENCE OF REDIRECTS

BACKGROUND OF THE INVENTION

One major problem facing modern computing systems and communications systems is the prevalence of spam messages. Spam messages are prevalent, and a serious issue, not only in e-mail systems, but also in SMS, Instant Messaging (IM), and other text based, messaging systems, and in virtually every other form of electronic communication. In addition, spam-like activity and function as begun to be implemented in images distributed by various means.

One form of spam that has become more and more common is a spam message that includes a URL that, when activated, links to one or more websites that include unsolicited, malicious, unwanted, offensive, or nuisance content, such as, but is not limited to: unsolicited or unwanted pornographic content; any content that promotes and/or is associated with fraud; any content that includes "work from home" or "be our representative" offers/scams; any content that includes money laundering or so-called "mule spam"; any content that promotes and/or is associated with various financial scams; any content that promotes and/or is associated with any other criminal activity; and/or any content that is unsolicited and/or undesirable, whether illegal in a given jurisdiction or not.

One method that could be used to determine if a message including a URL is potential spam, i.e., is "spammy", is to analyze the included URL by one or more URL analysis methods such as, but not limited to: analyzing various portions of the URL; activating the URL link to the associated web page; and/or analyzing the contents of the web page linked to by the URL. However the prevalence of URL shortening services, and other types of redirects, has significantly complicated traditional URL analysis, and in particular, has made accessing a web page, and the content of a web page, associated with a URL far more difficult.

URL shortening services typically provide users, including spammers, the ability to shorten the size, or number of characters, associated with a given URL by providing shortened URLs that map, or redirect, to the longer actual URL. URL shortening services are legitimately used to allow the URL to be included in text size limited communications, such as Twitter™. On the other hand, spammers can use URL shortening services to mask an actual spam URL, and associated web page content, by having multiple shortened URLs created that redirect to the actual URL, and/or each other.

Spammers have recently begun to regularly use URL redirects, including URL shortening service related URL redirects. In fact, many spammers now routinely employ a deeply nested series of URL redirects of various types, to frustrate, and/or avoid, URL analysis, and the retrieval of associated web page content.

Currently, redirects, and particularly nested redirects, make it difficult, if not impossible, to identify and block the spam because, using URL redirects, the spammy URL content can be hidden by way of a redirect shell game that prevents currently available link-following, and/or security, systems from automatically accessing the actual URL efficiently in a reasonable amount of time. Therefore, simply attempting to retrieve the content at an included URL will no longer reliably yield page content for analysis.

In addition, to further complicate the situation, redirects used by a spammer can be one or more of many different types of redirects, such as, but not limited to, HTTP redirects, HTML Meta redirects, and JavaScript redirects, and can include other issues such as tracking bugs, DOM manipulation, and incorrect HTTP response codes. In addition, the number of redirects that can be employed by spammers is effectively unlimited. Therefore, some spammers use multiple types of redirects, and/or a high number of redirects, to frustrate analysis. Consequently, it is not sufficient to simply have lists of sites/URLs for which redirects should be handled because there are too many sites, and too many different methods for redirection available to the spammer.

In order to effectively, and efficiently, perform URL analysis methods that require activating the URL and linking to the associated web page, redirects must be recognized and a determination must be made as to which type of redirect is in use, so that the URL related content can be obtained by traversing as many redirects as possible. However, pitfalls associated with redirect loops such as, but not limited to, extremely long chains of redirects, such as are used in some denial of service attacks, and tar-pitting, i.e., very slow redirects, must also be avoided. Currently available link-following, and/or security, systems typically fail to meet these criteria.

Related to the problem of redirects is the issue of tracking bugs. Tracking bugs are typically small pieces of code or images that must be executed or retrieved in order to obtain the URL page content required. Although, in some cases, it might be possible to retrieve content without retrieving the tracking bug, often this lack of retrieving the tracking bug is noted by the site's operator and will cause the connecting IP address, i.e., the URL analysis system, to be banned, typically at DNS level, from all sites hosted on that system; thereby effectively blocking a current link-following, and/or security, system from following the current URL and any other associated/hosted URLs.

Another associated issue is that of Document Object Model (DOM) manipulation. DOM is a cross-platform and language-independent convention for representing and interacting with objects in HTML, XHTML and XML documents. Aspects of the DOM, such as its "Elements", may be addressed and manipulated within the syntax of the programming language in use. Using DOM, an HTML page's content can be changed, or even populated, via JavaScript once the page is loaded. This can be an effective way for spammers to hide URL content.

In addition, some servers return non-traditional, or incorrect, HTTP status codes, such as 404 for a deleted short link. Many current link-following, and/or security, systems treat this as an error, and therefore end analysis and attempts to obtain web-page content.

As discussed above, current link-following, and/or security, systems are often unable to provide an efficient and reliable system for accessing, and analyzing the web page content associated with, URLs included in messages that are redirects, and/or include tracking bugs, and/or include DOM manipulation. As a result, currently, many URLs included in messages cannot be analyzed in a reasonable time to determine if a message is spam, i.e., if the included URL is spam related. Therefore, many of these nuisance, and at times harmful, messages, and included URLs, currently find their way to thousands of victims each year. Clearly, this is a far from ideal situation for the victims, but it is also a problem for all users of message systems, who currently must suffer with the delays, and false positives, and/or must be wary of all messages, even those of seemingly legitimate origin and intent.

SUMMARY

According to one embodiment, a method and system for automatically obtaining web page content in the presence of redirects includes a process for automatically obtaining web page content in the presence of redirects whereby an incoming message, such as, but not limited to, an e-mail, an SMS message, an Instant Message (IM), or any other form of electronic message, or image, is received. In one embodiment, the received message is analyzed to determine if the message contains any URLs.

In one embodiment, any detected URLs are then extracted and sent to a URL analysis process. In one embodiment, in the course of the URL analysis process, the URLs are analyzed by one or more URL analysis methods such as, but not limited to, analyzing portions of the URL, and/or activating the URL link to the associated web page, and/or analyzing the contents of the web page linked to by the URL. In one embodiment, when the URL link to the associated web page is activated, the HTTP response headers and content sent from a web page server in response to the browser HTTP requests to activate the URL link are analyzed to determine if the response includes a redirect to a new, or destination, URL, and associated web page, i.e., to determine if the detected URLs result in redirects.

In one embodiment, if the HTTP response indicates a redirect, a URL redirect analysis process is initiated. In one embodiment, the URL redirect analysis process includes a set of redirect processing procedures that are selectively applied to the results of HTTP requests depending on the type of redirect encountered. In one embodiment, each redirect is automatically followed. In one embodiment, for chains of redirects, the process is recursive, i.e., is repeated automatically for each redirect, from the beginning, and as if the new (destination) URL is itself an initial URL. In one embodiment, the URL redirect analysis process is repeated for each new URL as often as necessary, and/or up to a defined time limit, or a defined limited number of iterations, to obtain the end destination web page content.

In one embodiment, when processing the results of an HTTP request, if the HTTP request response is determined to be a redirect, then the URL redirect analysis process determines the type of redirect involved, and/or if other issues are present, such as, but not limited to: whether the redirect is an interstitial page redirect; whether the redirect is a Meta redirect; whether the redirect is a JavaScript (JS) redirect, including pop-ups, window.location redirects, and DOM manipulation redirects; whether the redirect is any form of redirect loop; whether frames, including inline frames, are involved; whether tracking bugs are present; whether DOM manipulation is present; and/or whether incorrectly used HTTP status codes are involved.

As noted above, in one embodiment, depending on the type of redirect, and/or issue, detected, one or more redirect processing procedures are taken that are specific to the type of redirect, and/or issue, detected in order to follow the redirect, or redirects. In various embodiments, in a single application of the URL redirect analysis process, multiple types of redirects, and issues, in a single URL string are addressed using the relevant redirect processing procedures specific to the types of redirects, and/or issues, detected.

In one embodiment, if at any point it is determined an original, or new, URL is not a redirect and provides access to the associated web page, then the web page, and/or web page content is accessed and analyzed.

In one embodiment, if, based on the results of the URL redirect analysis process, and/or the results of any of the redirect processing procedures, a URL is identified as being a spam, or potential spam, then protective action is taken such as, but not limited to, transforming the status of the URL, and the message including the URL, to a status of spam, or potential spam, and/or blocking the message including the URL, and/or the URL and all associated URLS, and/or adding the URL to a URL block list.

In one embodiment, if the URL redirect analysis fails to provide access to the associated web page, one or more further analysis actions are taken such as, but not limited to: checking on the hostname of the of the destination URL to see if it contains spam-related words or phrases, or follows any defined pattern, or specific format, known to be used by spammers; checking if the redirect domain exists in various URL block lists; and any other further analysis as discussed herein, and/or as known in the art at the time of filing, and/or as developed after the time of filing. In one embodiment, if the further analysis actions reveal potential spam, one or more protective actions are taken, as discussed herein, and/or as known in the art at the time of filing, and/or as developed after the time of filing. In one embodiment, if the further analysis actions fail to yield any reliable results, no further action is taken.

Using the method and system for automatically obtaining web page content in the presence of redirects, as discussed herein, spam messages, and spam URLs included in spam messages, can be efficiently and reliably identified even in the presence of multi-layered redirects, frames, DOM manipulation, tracking bugs, and incorrect HTTP status codes, and while avoiding pitfalls associated with redirect loops such as extremely long chains of redirects and tar-pitting.

In addition, using the method and system for automatically obtaining web page content in the presence of redirects, as discussed herein, multiple types of redirects, and issues, in a single URL string can be addressed using the relevant redirect processing procedures specific to the types of redirects, and/or issues, detected. Consequently, using the method and system for automatically obtaining web page content in the presence of redirects, as discussed herein, far more spam messages can be identified and stopped than is possible using currently available methods and systems.

Figure 1:
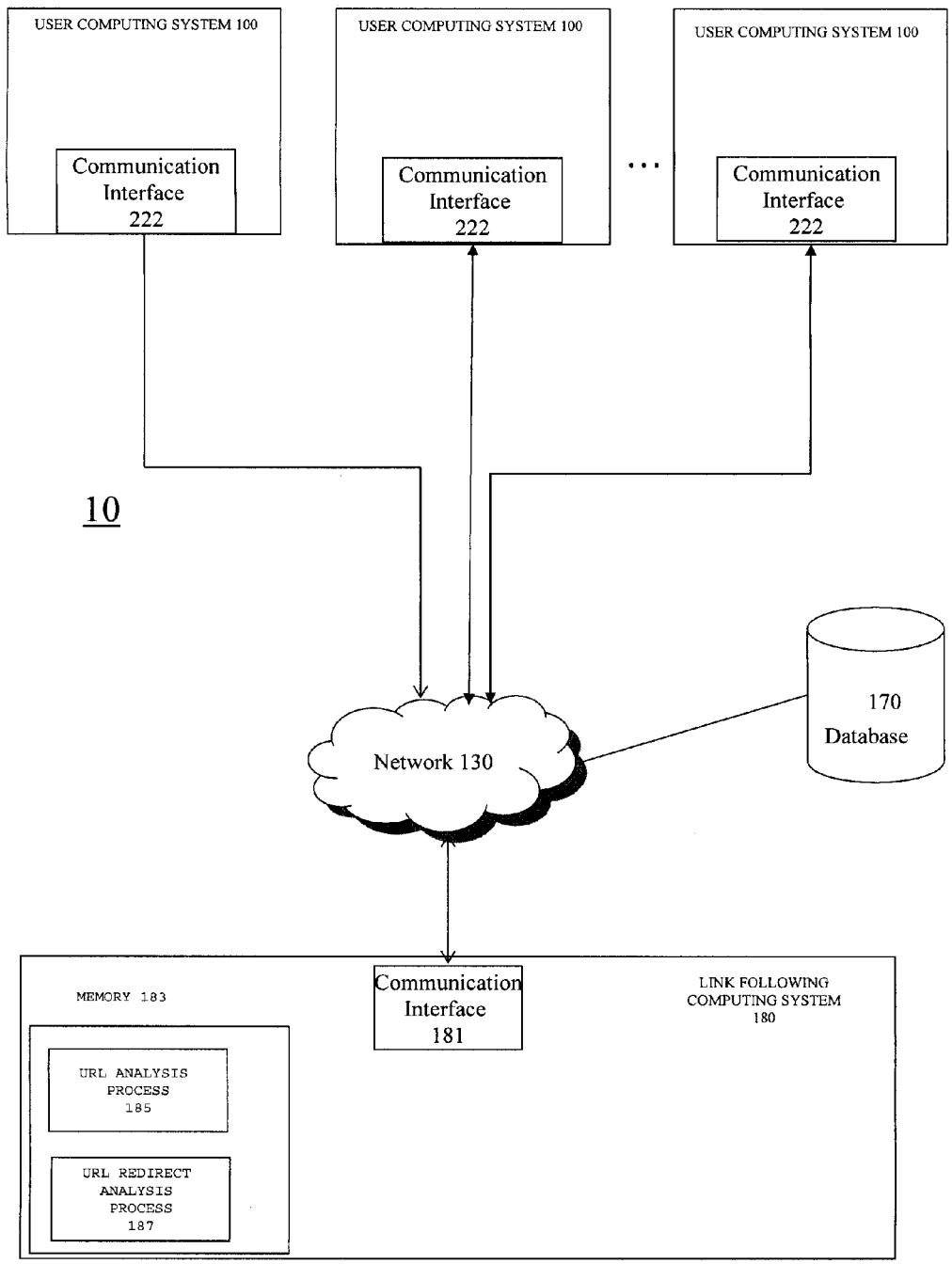
FIG. 1 is a block diagram of an exemplary hardware architecture for implementing one embodiment including user computing systems, a network or cloud, a database, and a link following computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment, a method and system for automatically obtaining web page content in the presence of redirects includes a process for automatically obtaining web page content in the presence of redirects whereby an incoming message is received.

In various embodiments, the received incoming message is, but is not limited to, any of the following: an e-mail message; an SMS message; an Instant Message (IM); any text based message; and/or any other message; or image, used in any message based system, as discussed herein, and/or as known in the art at the time of filing, and/or as developed after the time of filing.

In one embodiment, the incoming message is addressed to a user computing system and is received at a link following computing system.

In one embodiment, the received message is analyzed to determine if the message contains any URLs by one or more processors associated with one or more computing systems.

In one embodiment, any detected URLs are extracted using one or more processors associated with one or more computing systems and sent to a URL analysis process.

Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

In one embodiment, in the course of the URL analysis process, the extracted original URLs are analyzed by one or more URL analysis methods such as, but not limited to, analyzing portions of the original URL, and/or activating the original URL link to the associated web page, and/or analyzing the contents of the web page linked to by the original URL.

In one embodiment, then the original URL link to the associated web page is activated, the HTTP response headers and content sent from a web page server in response to the browser HTTP requests to activate an original URL link are analyzed by one or more processors associated with one or more computing systems to determine if the response includes a redirect to a new, or destination, URL and associated web page, i.e., to determine if the extracted original URLs result in redirects.

In one embodiment, if a response is determined to be a redirect during the URL analysis process, a URL redirect analysis process is initiated. In one embodiment, the URL redirect analysis process includes a set of redirect processing procedures that are selectively applied by one or more processors associated with one or more computing systems to the results of HTTP requests depending on the type of redirect encountered.

In one embodiment, as part of the URL redirect analysis process, each redirect associated with an original URL is automatically followed. For loops or chains of redirects, the process is recursive, i.e., is repeated automatically for each redirect, from the beginning, and as if the new (destination) URL is itself an original URL. In one embodiment, the URL redirect analysis process is repeated for each new URL as often as necessary, and/or up to a defined time limit, or a defined limited number of iterations, to obtain the end destination web page content.

In one embodiment, when processing the results of an HTTP request, if the response is determined to be a redirect, then the URL redirect analysis process determines the type of redirect involved, and/or if other issues are present, such as, but not limited to: whether the redirect is an interstitial page redirect; whether the redirect is a Meta redirect; whether the redirect is a JavaScript (JS) redirect, including pop-ups, window.location redirects, and DOM manipulation redirects; whether the redirect is any form of redirect loop; whether frames, including inline frames, are involved; whether tracking bugs are present; whether DOM manipulation is present; and/or whether incorrectly used HTTP status codes are involved.

In one embodiment, depending on the type of redirect, and/or issue detected, one or more redirect processing procedures specific to the type of redirect, and/or issue, detected are taken in order to follow the redirect, or redirects through to the web page content.

In one embodiment, the URL redirect analysis process determines if the redirect is an interstitial page type of URL-to-URL redirect.

Interstitial pages are typically used by URL shortening services to warn users of potentially malicious content at the destination URL, or to confirm the age of a user. In some embodiments, the mere determination that the redirect is an interstitial page results in the status of the URL, and the message including the URL, being transformed by one or more processors associated with one or more computing systems to a status of spam under the direction of an interstitial page redirect processing procedure.

In some embodiments, interstitial page redirects are further analyzed by one or more processors associated with one or more computing systems under the direction of the interstitial page redirect processing procedure and the interstitial page redirects are matched with a combination of regular expressions (RE) per domain, and content analysis. In some cases, the interstitial page will indicate the short link has been deleted but does not provide the destination URL. In some embodiments, in configurable cases, this is taken by the interstitial page redirect processing procedure as sufficient evidence to transform a status of the URL, and the message including the URL, to a status of spam using one or more processors associated with one or more computing systems.

In one embodiment, the URL redirect analysis process determines if the redirect is a Meta redirect.

Meta redirects are a primitive redirect by use of an HTML tag. In one embodiment, Meta redirects are matched with a RE by a Meta redirect processing procedure and one or more processors associated with one or more computing systems.

In one embodiment, the URL redirect analysis process determines if the redirect is a JavaScript (JS) redirect, including pop-ups, window.location redirects, and DOM manipulation redirects.

In one embodiment, JS redirects are matched with an RE by a JS redirect processing procedure and one or more processors associated with one or more computing systems. In one embodiment, JS is executed directly by the JS redirect processing procedure and one or more processors associated with one or more computing systems.

In one embodiment, dynamic limits are used by the URL redirect analysis process to limit the number of redirects followed and therefore redirect loops are detected and avoided.

In one embodiment, the URL redirect analysis process determines if frames, including inline frames, are present and, if present, a frame redirect processing procedure is employed and frames are handled by defining/identifying a frameset and specifying a URL for each frame under the direction of one or more processors associated with one or more computing systems.

In one embodiment, a maximum number of frames per web page eligible for analysis is defined. Any frames exceeding the maximum number are not analyzed. In one embodiment, each frame is recursed into, following any additional redirects by the frame redirect processing procedure.

In one embodiment, the URL redirect analysis process determines if tracking bugs are present, and if present, the tracking bugs are retrieved by a tracking bug redirect processing procedure and one or more processors associated with one or more computing systems.

Web page/web site owners use tracking bugs to track users and also frustrate automated access and/or analysis. As noted above, if a tracking bug is present but not retrieved, the web page/web site will typically be delivered once, but subsequent requests will fail, as the IP address will be automatically blocked at DNS level by the site. This prevents access to any site hosted on the same service. In one embodiment, tracking bugs are intelligently detected using REs and content analysis, and the tracking bugs are automatically retrieved by the tracking bug redirect processing procedure under the direction of one or more processors associated with one or more computing systems.

As noted above, web pages can also be modified dynamically by JS altering the page's DOM. In one embodiment, the URL redirect analysis process determines if this is the case and, in one embodiment, any JS altering the page's DOM is analyzed by a DOM manipulation redirect processing procedure and one or more processors associated with one or more computing systems to identify embedded content, which is often obfuscated, and also detect embedded URLs.

In one embodiment, the embedded URLs are treated by the DOM manipulation redirect processing procedure in the same manner as frames, i.e., each embedded URL is recursed into, following any additional embedded URL/redirects.

As noted above, some servers return non-traditional, or incorrect, HTTP status codes, such as 404 for a deleted short link. Many current link-following, and/or security, systems treat this as an error, and therefore end analysis and attempts to obtain web-page content. However, in one embodiment, in configurable cases, when such an HTTP status code is received, the attached data indicating the reason for the HTTP status code is analyzed and, if the analysis indicates a non-traditional, or incorrect, HTTP status coding, that server's use of the HTTP status code is recorded and analysis is continued in both the current instance, and future instances by the URL redirect analysis process, in both the present occurrence, and future occurrences.

In various embodiments, any combination of the redirect processing procedures discussed above, and/or any other redirect processing procedures as known in the art at the time of filing, and/or as developed after the time of filing, are used and/or employed by the URL redirect analysis process and a process for automatically obtaining web page content in the presence of redirects.

As noted above, in one embodiment, each redirect is automatically followed and for chains of redirects, the process is recursive, i.e., is repeated automatically for each redirect, from the beginning, and as if the new (destination) URL is itself an initial URL. In one embodiment, the URL redirect analysis process is repeated for each new URL as often as necessary, and/or up to a defined time limit, or a defined limited number of iterations, to obtain the end destination web page content.

In one embodiment, if at any point it is determined an original, or new, URL is not a redirect and provides access to the associated web page, then the web page, and/or web page content is accessed and analyzed.

In one embodiment, if, based on the results of the URL redirect analysis process, and/or the results of any of the redirect processing procedures, a URL is identified as being spam, or potential spam, then protective action is taken such as, but not limited to, transforming the status of the URL, and the message including the URL, to a status of spam, or potential spam, and/or blocking the message including the URL, and/or the URL and all associated URLS, and/or adding the URL to a URL block list.

In one embodiment, if, the URL redirect analysis fails to provide access to the associated web page, one or more further analysis actions are taken such as, but not limited to: checking on the hostname of the of the destination URL to see if it contains spam-related words or phrases, or follows any defined pattern, or specific format, known to be used by spammers; checking if the redirect domain exists in various URL block lists; and any other further analysis as discussed herein, and/or as known in the art at the time of filing, and/or as developed after the time of filing. In one embodiment, if the further analysis actions reveal potential spam, one or more protective actions are taken, as discussed herein, and/or as known in the art at the time of filing, and/or as developed after the time of filing. In one embodiment, if the further analysis actions fail to yield any reliable results, no further action is taken.

FIG. 1 shows a block diagram of an exemplary hardware system 10 suitable for implementing one embodiment of a process for automatically obtaining web page content in the presence of redirects, such as exemplary process 300 of FIG. 3 discussed below. Returning to FIG. 1, exemplary hardware system 10 includes: one or more user computing system(s) 100, including communication interface(s) 222; link following computing system 180 including memory 183, communication interface 181, URL analysis process 185, and URL redirect analysis process 187; and database 170; all communicating via communication interfaces 222, 181, and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as link following computing system 180 (discussed below) or any one or more of other user computing system(s) 100.

As used herein, the term "computing system", such as is included in the terms "user computing system" and "link following computing system" includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for automatically obtaining web page content in the presence of redirects in accordance with at least one of the embodiments as described herein.

Returning to FIG. 1, exemplary hardware system 10 includes link following computing system 180. In one embodiment, link following computing system 180 is a server computing system that is, in turn, associated with one or more client computing systems, such as user computing system(s) 100, that are users of one more security systems provided through, or monitored by, the security system provider associated with link following computing system 180. In one embodiment, link following computing system 180 is part of a cloud computing environment.

As noted above, in one embodiment, link following computing system 180 includes memory 183, communication interface 181, URL analysis process 185, and URL redirect analysis process 187. As discussed in more detail below, URL analysis process 185 is used to analyze all URLs detected in messages addressed to user computing system(s) 100 and URL redirect analysis process 187 is used to further analyze URLs that are determined at URL analysis process 185 to result in redirects.

Link following computing system 180, memory 183, URL analysis process 185, and URL redirect analysis process 187 are discussed in more detail below with respect to FIGS. 2 and 3.

In various embodiments, link following computing system 180 can be any computing system as defined herein and/or as known in the art at the time of filing and/or as developed thereafter, that includes components that can execute all, or part, of a process for automatically obtaining web page content in the presence of redirects in accordance with at least one of the embodiments as described herein.

In some embodiments, all, or part, of the functions performed by link following computing system 180, memory 183, URL analysis process 185, and URL redirect analysis process 187, are implemented on, and/or performed by, user computing system(s) 100, or any other computing system as discussed herein, and/or as known in the art at the time of filing, and/or as developed after the time of filing.

Also shown in FIG. 1 is database 170. In one embodiment, database 170 is a data storage device, a designated server system or computing system, or a designated portion of one or more server systems or computing systems, such as computing system(s) 100, and/or link following computing system 180, or a distributed database, or an external and/or portable hard drive. In one embodiment, database 170 is a webpage server through which access to webpages are provided in response to the activation of URLs, such as URLs included in messages, and/or extracted from messages.

In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for automatically obtaining web page content in the presence of redirects, and/or a provider of a security system, and/or a link following computing system 180. In one embodiment, database 170 is part of a cloud computing environment.

In one embodiment, computing system(s) 100, link following computing system 180, and database 170, are coupled through network 130. In various embodiments, network 130 is any network, cloud, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, link following computing system 180, and database 170, are coupled in a cloud computing environment.

Figure 2:
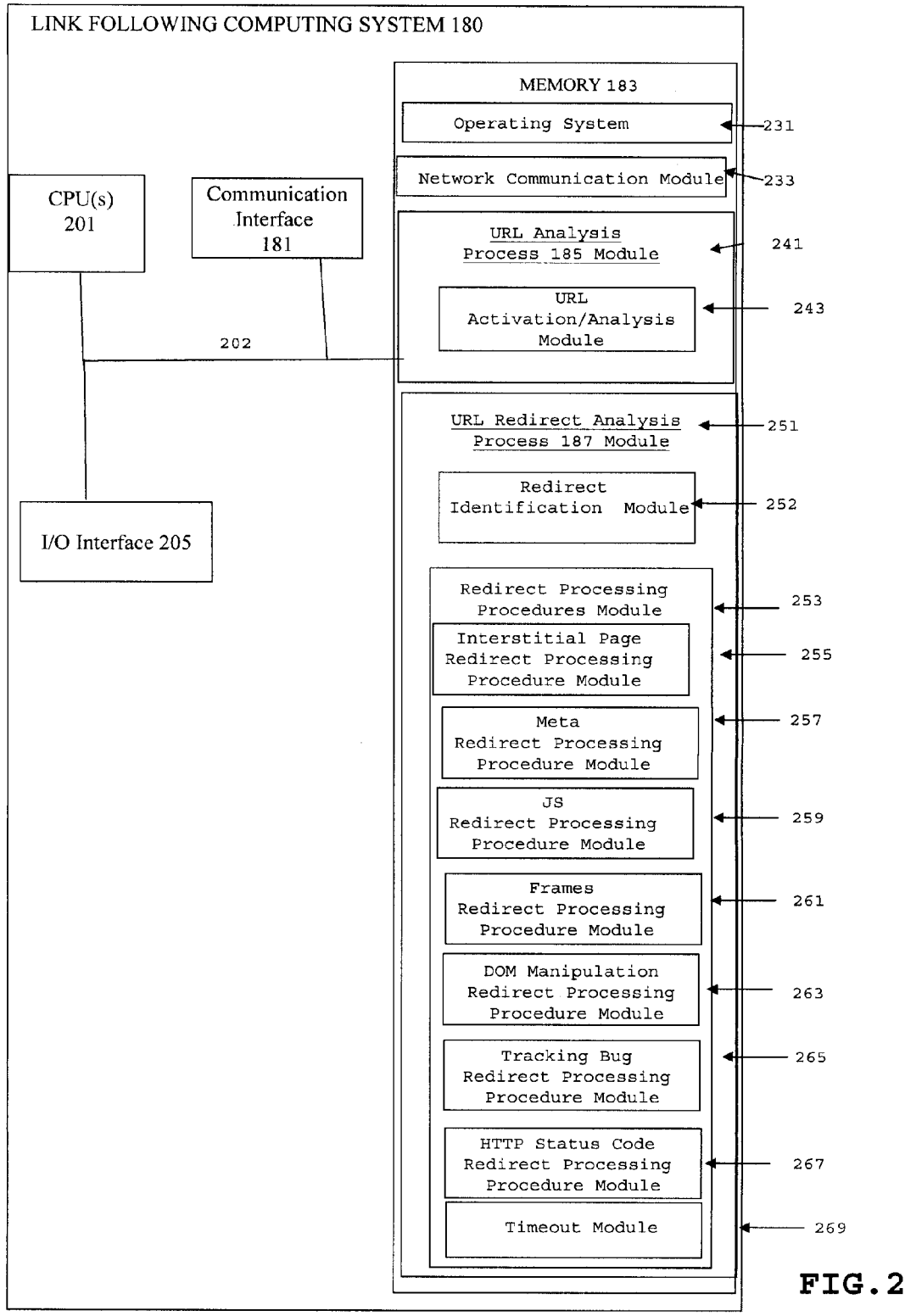
FIG. 2 is a block diagram of an exemplary link following computing system of FIG. 1 in accordance with one embodiment.

FIG. 2 is a more detailed block diagram of a link following computing system 180. As seen in FIG. 2, in one embodiment, link following computing system 180 includes one or more Central Processing Unit(s), CPU(s) 201; memory 183; at least one communication interface 181; and an Input/Output interface, I/O interface 205, all interconnected by one or more communication buses 202.

As also seen in FIG. 2, in one embodiment, memory 183 can store data and/or instructions associated with, but not limited to, the following elements, subsets of elements, and/or super sets of elements for processing by one or more processors, such as CPU(s) 201: operating system 231 that includes procedures, data, and/or instructions for handling various services and performing/coordinating hardware dependent tasks; network communications module 233 that includes procedures, data, and/or instructions, for, along with communication interface 181, connecting link following computing system 180 to other computing systems, such as user computing system(s) 100, and/or a network, such as network 130 of FIG. 1, and/or a database, such as database 170 of FIG. 1; URL analysis process 185 module 241 (FIG. 2) that includes procedures, data, and/or instructions, for implementing and operating a URL analysis process, such as URL analysis process 185 of FIG. 1; and URL redirect analysis process 187 module 251 (FIG. 2) that includes procedures, data, and/or instructions, for implementing and operating a URL redirect analysis process, such as URL redirect analysis process 187 of FIG. 1.

As also seen in FIG. 2, in one embodiment, URL analysis process 185 module 241 (FIG. 2) of memory 183 includes URL activation/analysis module 243 that includes procedures, data, and/or instructions for analyzing extracted original URLs using one or more URL analysis methods such as, but not limited to, analyzing portions of the original URL, and/or activating the original URL link to the associated web page, and/or analyzing the contents of the web page linked to by the original URL and, when the original URL link to the associated web page is activated, analyzing the HTTP response headers and content sent from a web page server in response to the browser HTTP requests to activate an original URL link to determine if the response includes a redirect to a new, or destination, URL and associated web page, i.e., to determine if the extracted original URLs result in redirects.

As also seen in FIG. 2, in one embodiment, memory 183 includes URL redirect analysis process 187 module 251 that includes procedures, data, and/or instructions for, if the response is determined to be a redirect during the URL analysis process at URL analysis process 185 module 241, initiating a URL redirect analysis process that includes a set of redirect processing procedures that are selectively applied by one or more processors associated with one or more computing systems to the results of HTTP requests depending on the type of redirect encountered. In one embodiment, as part of the URL redirect analysis process, each redirect associated with an original URL is automatically followed. For loops or chains of redirects, the process is recursive, i.e., is repeated automatically for each redirect, from the beginning, and as if the new (destination) URL is itself an original URL. In one embodiment, the URL redirect analysis process is repeated for each new URL as often as necessary, and/or up to a defined time limit, or a defined limited number of iterations, to obtain the end destination web page content, as established and implemented by timeout module 269.

As also seen in FIG. 2, in one embodiment, URL redirect analysis process 187 module 251 (FIG. 2) of memory 183 includes redirect identification module 252 that includes procedures, data, and/or instructions for determining the type of redirect involved, and/or if other issues are present, such as, but not limited to: whether the redirect is an interstitial page redirect; whether the redirect is a Meta redirect; whether the redirect is a JavaScript (JS) redirect, including pop-ups, window.location redirects, and DOM manipulation redirects; whether the redirect is any form of redirect loop; whether frames, including inline frames, are involved; whether tracking bugs are present; whether DOM manipulation is present; and/or whether incorrectly used HTTP status codes are involved.

As also seen in FIG. 2, in one embodiment, URL redirect analysis process 187 module 251 (FIG. 2) of memory 183 includes redirect processing procedures module 253 that includes procedures, data, and/or instructions associated with one or more redirect processing procedures that are, in one embodiment, applied depending on the type of redirect(s), and/or issue(s), identified at redirect identification module 252 in order to follow the redirect, or redirects through to the web page content.

As also seen in FIG. 2, in one embodiment, redirect processing procedures module 253 of URL redirect analysis process 187 module 251 includes interstitial page redirect processing procedure module 255 that includes procedures, data, and/or instructions for handling interstitial page redirects. In some embodiments, the mere determination that the redirect is an interstitial page results in the status of the URL, and the message including the URL, being transformed by one or more processors associated with one or more computing systems to a status of spam under the direction of interstitial page redirect processing procedure module 255. In some embodiments, interstitial page redirects are further analyzed under the direction of interstitial page redirect processing procedure module 255, and one or more processors associated with one or more computing systems, and the interstitial page redirects are matched with a combination of regular expressions (RE) per domain, and content analysis. In some cases, the interstitial page will indicate the short link has been deleted but does not provide the destination URL. In some embodiments, in configurable cases, this is taken by interstitial page redirect processing procedure module 255 as sufficient evidence to transform a status of the URL, and the message including the URL, to a status of spam using one or more processors associated with one or more computing systems.

As also seen in FIG. 2, in one embodiment, redirect processing procedures module 253 of URL redirect analysis process 187 module 251 includes Meta redirect processing procedure module 257 that includes procedures, data, and/or instructions for handling Meta redirects. In one embodiment, Meta redirects are matched with a RE under the direction of Meta redirect processing procedure module 257 and one or more processors associated with one or more computing systems.

As also seen in FIG. 2, in one embodiment, redirect processing procedures module 253 of URL redirect analysis process 187 module 251 includes JS redirect processing procedure module 259 that includes procedures, data, and/or instructions for handling JS redirects. In one embodiment, JS redirects are matched with an RE under the direction of JS redirect processing procedure module 259 and one or more processors associated with one or more computing systems. In one embodiment, JS is executed directly under the direction of JS redirect processing procedure module 259 and one or more processors associated with one or more computing systems.

As also seen in FIG. 2, in one embodiment, redirect processing procedures module 253 of URL redirect analysis process 187 module 251 includes frames redirect processing procedure module 261 that includes procedures, data, and/or instructions for handling frames. In one embodiment, frames are handled by defining/identifying a frameset and specifying a URL for each frame under the direction of frames redirect processing procedure module 261 and one or more processors associated with one or more computing systems. In one embodiment, a maximum number of frames per web page eligible for analysis is defined. Any frames exceeding the maximum number are not analyzed by frames redirect processing procedure module 261. In one embodiment, each frame is recursed into, following any additional redirects by the frame redirect processing procedure.

As also seen in FIG. 2, in one embodiment, redirect processing procedures module 253 of URL redirect analysis process 187 module 251 includes DOM manipulation redirect processing procedure module 263 that includes procedures, data, and/or instructions for handling cases of DOM manipulation. In one embodiment, any JS altering the page's DOM are analyzed under the direction of DOM manipulation redirect processing procedure module 263 and one or more processors associated with one or more computing systems, to identify embedded content, which is often obfuscated, and also detect embedded URLs. In one embodiment, the embedded URLs are treated by DOM manipulation redirect processing procedure module 263 in the same manner as frames are treated by frames redirect processing procedure module 261, i.e., each embedded URL is recursed into, following any additional embedded URL/redirects.

As also seen in FIG. 2, in one embodiment, redirect processing procedures module 253 of URL redirect analysis process 187 module 251 includes tracking bug redirect processing procedure module 265 that includes procedures, data, and/or instructions for handling tracking bugs. In one embodiment, redirect identification module 252 determines if tracking bugs are present, and if present, the tracking bugs are retrieved by tracking bug redirect processing procedure module 265 and one or more processors associated with one or more computing systems. In one embodiment, tracking bugs are intelligently detected using REs and content analysis under the direction of tracking bug redirect processing procedure module 265 and one or more processors associated with one or more computing systems.

As also seen in FIG. 2, in one embodiment, redirect processing procedures module 253 of URL redirect analysis process 187 module 251 includes HTTP status code redirect processing procedure module 267 that includes procedures, data, and/or instructions for handling non-traditional, or incorrect, usage of HTTP status codes. As noted above, some servers return non-traditional, or incorrect, HTTP status codes, such as 404 for a deleted short link. Many current link-following, and/or security, systems treat this as an error, and therefore end analysis and attempts to obtain web-page content.

However, in one embodiment, in configurable cases, when such an HTTP status code is received, the attached data indicating the reason for the HTTP status code is analyzed and, if the analysis indicates a non-traditional, or incorrect, HTTP status coding, that server's use of the HTTP status code is recorded and analysis is continued in both the current instance, and future instances.

As also seen in FIG. 2, in one embodiment, redirect processing procedures module 253 of URL redirect analysis process 187 module 251 includes timeout module 269 that includes procedures, data, and/or instructions for establishing, and enforcing, a timeout period, and/or timeout iteration count, limit. In various embodiments, the timeout period, or timeout iteration count, can be any period, or count, desired by the provider of the process for automatically obtaining web page content in the presence of redirects.

In various embodiments, any combination of the redirect processing procedures, and/or modules, discussed above, and/or any other redirect processing procedures, and/or modules, as discussed herein, and/or as known in the art at the time of filing, and/or as developed after the time of filing, are used and/or employed by URL redirect analysis process 187 module 251 and link following computing system 180.

In addition, those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary link following computing system 180 is provided below with respect to FIG. 3.

Process

As noted above, spam messages are prevalent, and a serious issue, not only in e-mail systems, but also in SMS, Instant Message (IM), and other text based, messaging systems, or image, and in virtually every other form of electronic communication. Consequently, herein, the terms "message", "spam message", and "spam", include not only messages in e-mail systems, but also messages in SMS, Instant Messaging (IM), and other text based, messaging systems, image, and/or any other message, used in any other message based system as discussed herein, and/or as known in the art at the time of filing, and/or as developed after the time of filing.

According to one embodiment, a method and system for automatically obtaining web page content in the presence of redirects includes a process for automatically obtaining web page content in the presence of redirects whereby an incoming message, such as, but not limited to, an e-mail, an SMS message, Instant Message (IM), or any other form of electronic message, or image, is received. In one embodiment, the received message is analyzed to determine if the message contains any URLs.

In one embodiment, any detected URLs are then extracted and sent to a URL analysis process. In one embodiment, in the course of the URL analysis process, the URLs are analyzed by one or more URL analysis methods such as, but not limited to, analyzing portions of the URL, and/or activating the URL link to the associated web page, and/or analyzing the contents of the web page linked to by the URL. In one embodiment, when the URL link to the associated web page is activated, the HTTP response headers and content sent from a web page server in response to the browser HTTP requests to activate the URL link are analyzed to determine if the response includes a redirect to a new, or destination, URL, and associated web page, i.e., to determine if the detected URLs result in redirects.

In one embodiment, if the HTTP response indicates a redirect, a URL redirect analysis process is initiated. In one embodiment, the URL redirect analysis process includes a set of redirect processing procedures that are selectively applied to the results of HTTP requests depending on the type of redirect encountered.

In one embodiment, each redirect is automatically followed. In one embodiment, for chains of redirects, the process is recursive, i.e., is repeated automatically for each redirect, from the beginning, and as if the new (destination) URL is itself an initial URL. In one embodiment, the URL redirect analysis process is repeated for each new URL as often as necessary, and/or up to a defined time limit, or a defined limited number of iterations, to obtain the end destination web page content.

In one embodiment, when processing the results of an HTTP request, if the HTTP request response is determined to be a redirect, then the URL redirect analysis process determines the type of redirect involved, and/or if other issues are present, such as, but not limited to: whether the redirect is an interstitial page redirect; whether the redirect is a Meta redirect; whether the redirect is a JavaScript (JS) redirect, including pop-ups, window.location redirects, and DOM manipulation redirects; whether the redirect is any form of redirect loop; whether frames, including inline frames, are involved; whether tracking bugs are present; whether DOM manipulation is present; and/or whether incorrectly used HTTP status codes are involved.

As noted above, in one embodiment, depending on the type of redirect, and/or issue, detected, one or more redirect processing procedures are taken that are specific to the type of redirect, and/or issue, detected in order to follow the redirect, or redirects. In various embodiments, in a single application of the URL redirect analysis process, multiple types of redirects, and issues, in a single URL string are addressed using the relevant redirect processing procedures specific to the types of redirects, and/or issues, detected.

In one embodiment, if at any point it is determined an original, or new, URL is not a redirect and provides access to the associated web page, then the web page, and/or web page content is accessed and analyzed.

In one embodiment, if, based on the results of the URL redirect analysis process, and/or the results of any of the redirect processing procedures, a URL is identified as being a spam, or potential spam, then protective action is taken such as, but not limited to, transforming the status of the URL, and the message including the URL, to a status of spam, or potential spam, and/or blocking the message including the URL, and/or the URL and all associated URLS, and/or adding the URL to a URL block list.

In one embodiment, if, the URL redirect analysis fails to provide access to the associated web page, one or more further analysis actions are taken such as, but not limited to: checking on the hostname of the of the destination URL to see if it contains spam-related words or phrases, or follows any defined pattern, or specific format, known to be used by spammers; checking if the redirect domain exists in various URL block lists; and any other further analysis as discussed herein, and/or as known in the art at the time of filing, and/or as developed after the time of filing. In one embodiment, if the further analysis actions reveal potential spam, one or more protective actions are taken, as discussed herein, and/or as known in the art at the time of filing, and/or as developed after the time of filing. In one embodiment, if the further analysis actions fail to yield any reliable results, no further action is taken.

Figure 3:
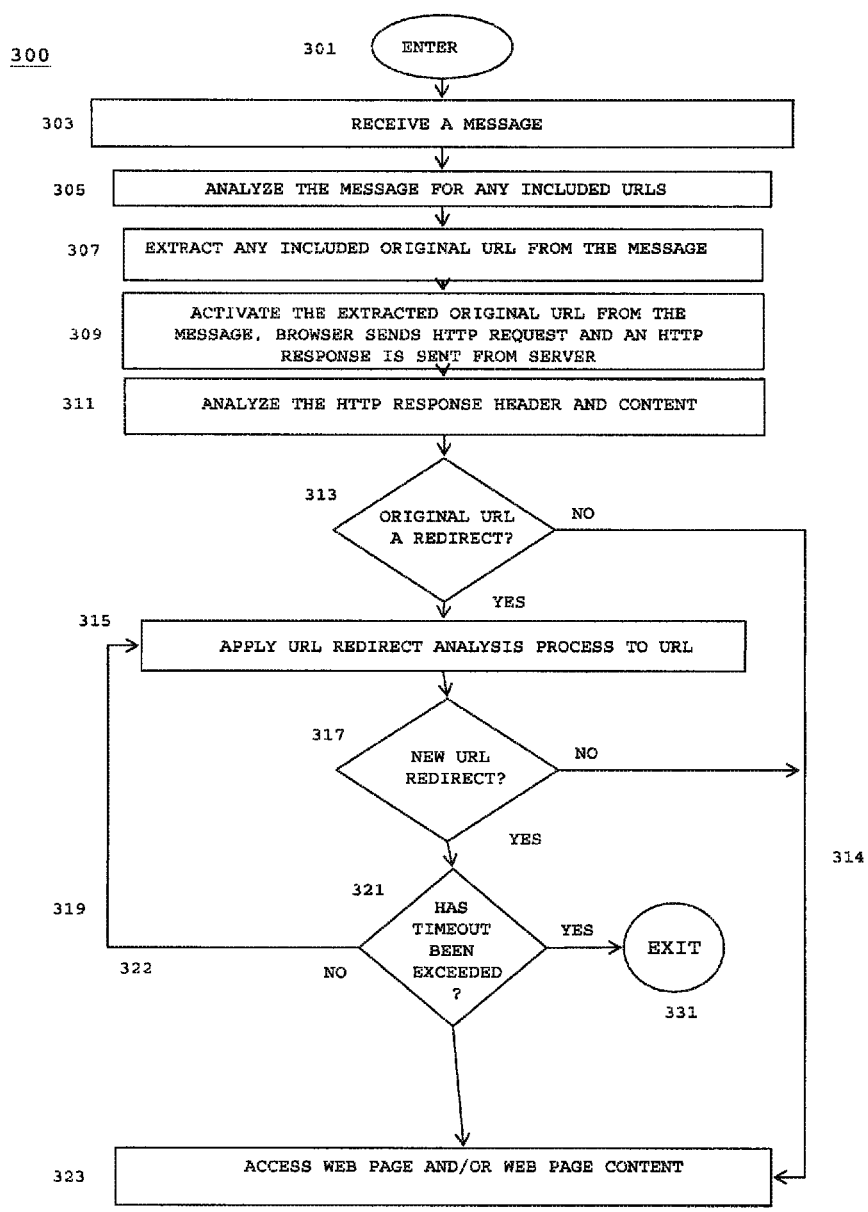
FIG. 3 is a flow chart depicting a process for automatically obtaining web page content in the presence of redirects in accordance with one embodiment.

FIG. 3 is a flow chart depicting a process for automatically obtaining web page content in the presence of redirects 300 in accordance with one embodiment.

Process for automatically obtaining web page content in the presence of redirects 300 begins at ENTER OPERATION 301 of FIG. 3 and process flow proceeds to RECEIVE A MESSAGE OPERATION 303.

In one embodiment, at RECEIVE A MESSAGE OPERATION 303 an incoming message is received.

In various embodiments, at RECEIVE A MESSAGE OPERATION 303 the received incoming message is, but is not limited to, any of the following: an e-mail message; an SMS message; an Instant Message (IM); any text based message; and/or any other message; and/or image; used in any message, or image, based system, as discussed herein, and/or as known in the art at the time of filing, and/or as developed after the time of filing.

In one embodiment, at RECEIVE A MESSAGE OPERATION 303 the incoming message is addressed to a user computing system, such as user computing system(s) 100 of FIG. 1, and is received at a link following computing system, such as link following computing system 180 of FIGS. 1 and 2.

Returning to FIG. 3, in one embodiment, once an incoming message is received at RECEIVE A MESSAGE OPERATION 303, process flow proceeds to ANALYZE THE MESSAGE FOR ANY INCLUDED URLS OPERATION 305.

In one embodiment, at ANALYZE THE MESSAGE FOR ANY INCLUDED URLS OPERATION 305 the message of RECEIVE A MESSAGE OPERATION 303 is analyzed to determine if the message contains any URLs.

In one embodiment, at ANALYZE THE MESSAGE FOR ANY INCLUDED URLS OPERATION 305 the message of RECEIVE A MESSAGE OPERATION 303 is analyzed to determine if the message contains any URLs using one or more processors, such as CPU(s) 201 of FIG. 2, associated with one or more computing systems, such as link following computing system 180 of FIGS. 1 and 2.

Returning to FIG. 3, in one embodiment, once the message of RECEIVE A MESSAGE OPERATION 303 is analyzed to determine if the message contains any URLs at ANALYZE THE MESSAGE FOR ANY INCLUDED URLS OPERATION 305 process flow proceeds to EXTRACT ANY INCLUDED ORIGINAL URL FROM THE MESSAGE OPERATION 307.

In one embodiment, at EXTRACT ANY INCLUDED ORIGINAL URL FROM THE MESSAGE OPERATION 307, any URL included in the message of RECEIVE A MESSAGE OPERATION 303 detected at ANALYZE THE MESSAGE FOR ANY INCLUDED URLS OPERATION 305 is extracted and labeled an original URL.

In one embodiment, at EXTRACT ANY INCLUDED ORIGINAL URL FROM THE MESSAGE OPERATION 307, any URL included in the message of RECEIVE A MESSAGE OPERATION 303 detected at ANALYZE THE MESSAGE FOR ANY INCLUDED URLS OPERATION 305 is extracted and labeled an original URL using one or more processors, such as CPU(s) 201 of FIG. 2, associated with one or more computing systems, such as link following computing system 180 of FIGS. 1 and 2.

Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

Returning to FIG. 3, in one embodiment, once any URL included in the message of RECEIVE A MESSAGE OPERATION 303 detected at ANALYZE THE MESSAGE FOR ANY INCLUDED URLS OPERATION 305 is extracted and labeled an original URL at EXTRACT ANY INCLUDED ORIGINAL URL FROM THE MESSAGE OPERATION 307, process flow proceeds to ACTIVATE THE EXTRACTED ORIGINAL URL FROM THE MESSAGE, BROWSER SENDS HTTP REQUEST AND AN HTTP RESPONSE IS SENT FROM SERVER OPERATION 309.

In one embodiment, at ACTIVATE THE EXTRACTED ORIGINAL URL FROM THE MESSAGE, BROWSER SENDS HTTP REQUEST AND AN HTTP RESPONSE IS SENT FROM SERVER OPERATION 309 each extracted original URL of EXTRACT ANY INCLUDED ORIGINAL URL FROM THE MESSAGE OPERATION 307 is sent to a URL analysis process and the extracted original URLs are analyzed by one or more URL analysis methods such as, but not limited to, analyzing portions of the original URL, and/or activating the original URL link to the associated web page, and/or analyzing the contents of the web page linked to by the original URL.

In one embodiment, at ACTIVATE THE EXTRACTED ORIGINAL URL FROM THE MESSAGE, BROWSER SENDS HTTP REQUEST AND AN HTTP RESPONSE IS SENT FROM SERVER OPERATION 309 each extracted original URL of EXTRACT ANY INCLUDED ORIGINAL URL FROM THE MESSAGE OPERATION 307 is activated.

In one embodiment, at ACTIVATE THE EXTRACTED ORIGINAL URL FROM THE MESSAGE, BROWSER SENDS HTTP REQUEST AND AN HTTP RESPONSE IS SENT FROM SERVER OPERATION 309 each extracted original URL of EXTRACT ANY INCLUDED ORIGINAL URL FROM THE MESSAGE OPERATION 307 is activated using one or more processors, such as CPU(s) 201 of FIG. 2, associated with one or more computing systems, such as link following computing system 180 of FIGS. 1 and 2.

Returning to FIG. 3, for each extracted original URL of EXTRACT ANY INCLUDED ORIGINAL URL FROM THE MESSAGE OPERATION 307 that is activated at ACTIVATE THE EXTRACTED ORIGINAL URL FROM THE MESSAGE, BROWSER SENDS HTTP REQUEST AND AN HTTP RESPONSE IS SENT FROM SERVER OPERATION 309, a responses to the browser HTTP requests to activate the original URL link is generated that includes HTTP response headers and content sent from a web page server.

In one embodiment, once each extracted original URL of EXTRACT ANY INCLUDED ORIGINAL URL FROM THE MESSAGE OPERATION 307 is activated at ACTIVATE THE EXTRACTED ORIGINAL URL FROM THE MESSAGE, BROWSER SENDS HTTP REQUEST AND AN HTTP RESPONSE IS SENT FROM SERVER OPERATION 309 process flow proceeds to ANALYZE THE HTTP RESPONSE HEADER AND CONTENT OPERATION 311.

In one embodiment, at ANALYZE THE HTTP RESPONSE HEADER AND CONTENT OPERATION 311 the HTTP response headers and content sent from web page servers in response to the browser HTTP requests to activate the original URL links are analyzed to determine if the response includes a redirect to a new, or destination, URL and associated web page, i.e., to determine if the extracted original URLs result in redirects.

In one embodiment, at ANALYZE THE HTTP RESPONSE HEADER AND CONTENT OPERATION 311 the HTTP response headers and content sent from web page servers in response to the browser HTTP requests to activate the original URL links are analyzed using one or more processors, such as CPU(s) 201 of FIG. 2, associated with one or more computing systems, such as link following computing system 180 of FIGS. 1 and 2, to determine if the response includes a redirect to a new, or destination, URL and associated web page, i.e., to determine if the extracted original URLs result in redirects.

Returning to FIG. 3, based on the analysis of ANALYZE THE HTTP RESPONSE HEADER AND CONTENT OPERATION 311, a determination is made at ORIGINAL URL A REDIRECT? OPERATION 313 as to whether a given one of the extracted original URLs redirects to a new, or destination, URL and associated web page, i.e., if the given extracted original URL results in a redirect.

In one embodiment, if at ORIGINAL URL A REDIRECT? OPERATION 313 it is determined that the extracted original URL does not redirect to a new, or destination, URL and associated web page, i.e., a "NO" determination is made, then process flow proceeds directly to ACCESS WEB PAGE AND/OR WEB PAGE CONTENT OPERATION 323.

In one embodiment, at ACCESS WEB PAGE AND/OR WEB PAGE CONTENT OPERATION 323 the web page associated with the extracted original URL of EXTRACT ANY INCLUDED ORIGINAL URL FROM THE MESSAGE OPERATION 307 is accessed, and/or the contents of the web page associated with the extracted original URL are analyzed.

In one embodiment, if at ORIGINAL URL A REDIRECT? OPERATION 313 it is determined that the extracted original URL does redirect to a new, or destination, URL and associated web page, i.e., a "YES" determination is made, then process flow proceeds to APPLY URL REDIRECT ANALYSIS PROCESS TO URL OPERATION 315.

In one embodiment, at APPLY URL REDIRECT ANALYSIS PROCESS TO URL OPERATION 315 a URL redirect analysis process is initiated that includes a set of redirect processing procedures that are selectively applied to the results of ANALYZE THE HTTP RESPONSE HEADER AND CONTENT OPERATION 311 depending on the type of redirect, and/or other issues, encountered, and each redirect is automatically followed.

In one embodiment, at APPLY URL REDIRECT ANALYSIS PROCESS TO URL OPERATION 315 the URL redirect analysis process is initiated, and implemented by, one or more processors, such as CPU(s) 201 of FIG. 2, associated with one or more computing systems, such as link following computing system 180 of FIGS. 1 and 2.

Returning to FIG. 3, in one embodiment, as part of the URL redirect analysis process of APPLY URL REDIRECT ANALYSIS PROCESS TO URL OPERATION 315, each redirect associated with an extracted original URL is automatically followed.

In one embodiment, as part of the URL redirect analysis process of APPLY URL REDIRECT ANALYSIS PROCESS TO URL OPERATION 315, loops or chains of redirects, are treated by reclusively applying the URL redirect analysis process, i.e., the URL redirect analysis process is repeated automatically for each redirect, from the beginning, and as if the new (destination) URL is itself an original URL. As discussed below, this is indicated in FIG. 3 by NEW URL REDIRECT? OPERATION 317, and path 319 back to APPLY URL REDIRECT ANALYSIS PROCESS TO URL OPERATION 315.

In one embodiment, the URL redirect analysis process of APPLY URL REDIRECT ANALYSIS PROCESS TO URL OPERATION 315, is repeated for each new URL as often as necessary, and/or up to a defined time limit, or a defined limited number of iterations, to obtain the end destination web page content. The implementation and application of the time limit, or a defined limited number of iterations, as discussed below, is represented by HAS TIMEOUT BEEN EXCEEDED? OPERATION 321 in FIG. 3.

In one embodiment, the URL redirect analysis process of APPLY URL REDIRECT ANALYSIS PROCESS TO URL OPERATION 315 determines the type of redirect involved, and/or if other issues are present, such as, but not limited to: whether the redirect is an interstitial page redirect; whether the redirect is a Meta redirect; whether the redirect is a JavaScript (JS) redirect, including pop-ups, window.location redirects, and DOM manipulation redirects; whether the redirect is any form of redirect loop; whether frames, including inline frames, are involved; whether tracking bugs are present; whether DOM manipulation is present; and/or whether incorrectly used HTTP status codes are involved.

In one embodiment, depending on the type of redirect, and/or issue detected, the URL redirect analysis process of APPLY URL REDIRECT ANALYSIS PROCESS TO URL OPERATION 315 applies one or more redirect processing procedures specific to the type of redirect, and/or issue, detected in order to follow the redirect, or redirects, through to the web page content.

In one embodiment, the URL redirect analysis process of APPLY URL REDIRECT ANALYSIS PROCESS TO URL OPERATION 315 determines if the redirect is an interstitial page type of URL-to-URL redirect.

Interstitial pages are typically used by URL shortening services to warn users of potentially malicious content at the destination URL, or to confirm the age of a user. In some embodiments, the mere determination that the redirect is an interstitial page results in the status of the URL, and the message including the URL, being transformed using one or more processors, such as CPU(s) 201 of FIG. 2, associated with one or more computing systems, such as link following computing system 180 of FIGS. 1 and 2, to a status of spam under the direction of an interstitial page redirect processing procedure.

In some embodiments, interstitial page redirects are further analyzed using one or more processors, such as CPU(s) 201 of FIG. 2, associated with one or more computing systems, such as link following computing system 180 of FIGS. 1 and 2, under the direction of the interstitial page redirect processing procedure and the interstitial page redirects are matched with a combination of regular expressions (RE) per domain, and content analysis.

In some cases, the interstitial page will indicate the short link has been deleted but does not provide the destination URL. In some embodiments, in configurable cases, this is taken by the interstitial page redirect processing procedure as sufficient evidence to transform a status of the URL, and the message including the URL, to a status of spam using one or more processors, such as CPU(s) 201 of FIG. 2, associated with one or more computing systems, such as link following computing system 180 of FIGS. 1 and 2.

Returning to FIG. 3, in one embodiment, the URL redirect analysis process of APPLY URL REDIRECT ANALYSIS PROCESS TO URL OPERATION 315 determines if the redirect is a Meta redirect.

Meta redirects are a primitive redirect by use of an HTML tag. In one embodiment, Meta redirects are matched with a RE by a Meta redirect processing procedure and using one or more processors, such as CPU(s) 201 of FIG. 2, associated with one or more computing systems, such as link following computing system 180 of FIGS. 1 and 2.

Returning to FIG. 3, in one embodiment, the URL redirect analysis process of APPLY URL REDIRECT ANALYSIS PROCESS TO URL OPERATION 315 determines if the redirect is a JavaScript (JS) redirect, including pop-ups, window.location redirects, and DOM manipulation redirects.

In one embodiment, JS redirects are matched with an RE by a JS redirect processing procedure using one or more processors, such as CPU(s) 201 of FIG. 2, associated with one or more computing systems, such as link following computing system 180 of FIGS. 1 and 2.

In one embodiment, JS is executed directly by the JS redirect processing procedure using one or more processors, such as CPU(s) 201 of FIG. 2, associated with one or more computing systems, such as link following computing system 180 of FIGS. 1 and 2.

Returning to FIG. 3, in one embodiment, the URL redirect analysis process of APPLY URL REDIRECT ANALYSIS PROCESS TO URL OPERATION 315 uses dynamic limits to limit the number of redirects followed and therefore redirect loops are detected and avoided.

In one embodiment, the URL redirect analysis process of APPLY URL REDIRECT ANALYSIS PROCESS TO URL OPERATION 315 determines if frames, including inline frames, are present and, if present, a frame redirect processing procedure is employed and frames are handled by defining/identifying a frameset and specifying a URL for each frame using one or more processors, such as CPU(s) 201 of FIG. 2, associated with one or more computing systems, such as link following computing system 180 of FIGS. 1 and 2.

Returning to FIG. 3, a maximum number of frames per web page eligible for analysis is defined. Any frames exceeding the maximum number are not analyzed. In one embodiment, each frame is recursed into, following any additional redirects by the frame redirect processing procedure.

In one embodiment, the URL redirect analysis process of APPLY URL REDIRECT ANALYSIS PROCESS TO URL OPERATION 315 determines if tracking bugs are present, and if present, the tracking bugs are retrieved by a tracking bug redirect processing procedure using one or more processors, such as CPU(s) 201 of FIG. 2, associated with one or more computing systems, such as link following computing system 180 of FIGS. 1 and 2.

Web page/web site owners use tracking bugs to track users and also frustrate automated access and/or analysis. As noted above, if a tracking bug is present but not retrieved, the web page/web site will typically be delivered once, but subsequent requests will fail, as the IP address will be automatically blocked at DNS level by the site. This prevents access to any site hosted on the same service. In one embodiment, tracking bugs are intelligently detected using REs and content analysis, and the tracking bugs are automatically retrieved by the tracking bug redirect processing procedure under the direction of one or more processors associated with one or more computing systems.

Returning to FIG. 3, as noted above, web pages can also be modified dynamically by JS altering the page's DOM. In one embodiment, the URL redirect analysis process of APPLY URL REDIRECT ANALYSIS PROCESS TO URL OPERATION 315 determines if this is the case and, in one embodiment, any JS altering the page's DOM is analyzed by a DOM manipulation redirect processing procedure using one or more processors, such as CPU(s) 201 of FIG. 2, associated with one or more computing systems, such as link following computing system 180 of FIGS. 1 and 2, to identify embedded content, which is often obfuscated, and also detect embedded URLs.

Returning to FIG. 3, in one embodiment, the embedded URLs are treated by the DOM manipulation redirect processing procedure in the same manner as frames, i.e., each embedded URL is recursed into, following any additional embedded URL/redirects.

As noted above, some servers return non-traditional, or incorrect, HTTP status codes, such as 404 for a deleted short link. Many current link-following, and/or security, systems treat this as an error, and therefore end analysis and attempts to obtain web-page content. However, in one embodiment, in configurable cases, when such an HTTP status code is received, the attached data indicating the reason for the HTTP status code is analyzed by the URL redirect analysis process of APPLY URL REDIRECT ANALYSIS PROCESS TO URL OPERATION 315 and, if the analysis indicates a non-traditional, or incorrect, HTTP status coding, that server's use of the HTTP status code is recorded and analysis is continued in both the current instance, and future instances by the URL redirect analysis process, in both the present occurrence, and future occurrences.

In various embodiments, any combination of the redirect processing procedures discussed above, and/or any other redirect processing procedures, as discussed herein, and/or as known in the art at the time of filing, and/or as developed after the time of filing, are used and/or employed by the URL redirect analysis process of APPLY URL REDIRECT ANALYSIS PROCESS TO URL OPERATION 315 and process for automatically obtaining web page content in the presence of redirects 300.

In one embodiment, once a redirect analysis process is initiated that includes a set of redirect processing procedures that are selectively applied to the results of ANALYZE THE HTTP RESPONSE HEADER AND CONTENT OPERATION 311 depending on the type of redirect, and/or other issues, encountered, and each redirect is automatically followed at APPLY URL REDIRECT ANALYSIS PROCESS TO URL OPERATION 315, process flow proceeds to NEW URL REDIRECT? OPERATION 317.

In one embodiment, at NEW URL REDIRECT? OPERATION 317, based on the analysis of APPLY URL REDIRECT ANALYSIS PROCESS TO URL OPERATION 315, a determination is made as to whether a new, or destination, URL redirected to by the extracted original URL, also redirects to a new, or destination, URL and associated web page, i.e., if the new URL results in a redirect.

In one embodiment, if at ORIGINAL URL A REDIRECT? OPERATION 313 it is determined that a new URL does not redirect to a new, or destination, URL and associated web page, i.e., a "NO" determination is made, then the new URL is associated with the extracted original URL and process flow proceeds directly to ACCESS WEB PAGE AND/OR WEB PAGE CONTENT OPERATION 323.

In one embodiment, at ACCESS WEB PAGE AND/OR WEB PAGE CONTENT OPERATION 323 the web page associated with the new URL is accessed, and/or the contents of the web page associated with the new URL are analyzed.

In one embodiment, if at ORIGINAL URL A REDIRECT? OPERATION 313 it is determined that the new URL does redirect to a new, or destination, URL and associated web page, i.e., a "YES" determination is made, then the new URL is associated with the extracted original URL and process flow proceeds to HAS TIMEOUT BEEN EXCEEDED? OPERATION 321.

In one embodiment, at HAS TIMEOUT BEEN EXCEEDED? OPERATION 321 a determination is made as to whether the timeout period, or timeout iteration count, has been exceeded.

In various embodiments, the timeout period, or timeout iteration count, of HAS TIMEOUT BEEN EXCEEDED? OPERATION 321 can be any period, or count, desired by the provider of the process for automatically obtaining web page content in the presence of redirects. In some embodiments, the timeout period, or timeout iteration count, can be any period, or count, desired by one or more users of the process for automatically obtaining web page content in the presence of redirects and can be adjusted as desired.

In one embodiment, if at HAS TIMEOUT BEEN EXCEEDED? OPERATION 321 it is determined that either the timeout period of time, or the maximum number of allowed iterations of NEW URL REDIRECT? OPERATION 317 and path 319 back to APPLY URL REDIRECT ANALYSIS PROCESS TO URL OPERATION 315 have been executed, i.e., a "YES" result is obtained, then process flow proceeds to EXIT OPERATION 331 and process for automatically obtaining web page content in the presence of redirects 300 is exited to await new data.

In one embodiment, if the URL redirect analysis fails to provide access to the associated web page, then protective action is taken such as, but not limited to, using one or more processors associated with one or more computing systems to transform the status of the URL, and the message including the URL, to a status of spam, or potential spam, and/or blocking the message including the URL, and/or the URL and all associated URLS, and/or adding the URL to a URL block list.

In one embodiment, if at HAS TIMEOUT BEEN EXCEEDED? OPERATION 321 it is determined that neither the timeout period of time, nor the maximum number of allowed iterations of NEW URL REDIRECT? OPERATION 317 and path 319 back to APPLY URL REDIRECT ANALYSIS PROCESS TO URL OPERATION 315 have been executed, i.e., a "NO" result is obtained, then process flow proceeds to path 319, and back to APPLY URL REDIRECT ANALYSIS PROCESS TO URL OPERATION 315 until either a "NO" result is obtained at NEW URL REDIRECT? OPERATION 317 or a "YES result is obtained at HAS TIMEOUT BEEN EXCEEDED? OPERATION 321.

In one embodiment, if at any point it is determined an original, or new, URL is not a redirect and provides access to the associated web page, i.e., a "NO" result is obtained at either ORIGINAL URL A REDIRECT? OPERATION 313 or NEW URL REDIRECT? OPERATION 317, then the web page, and/or web page content is accessed and analyzed at ACCESS WEB PAGE AND/OR WEB PAGE CONTENT OPERATION 323.

In one embodiment, if, based on the results of the URL redirect analysis process, and/or the results of any of the redirect processing procedures, a URL is identified as being spam, or potential spam, then protective action is taken such as, but not limited to, transforming the status of the URL, and the message including the URL, to a status of spam, or potential spam, and/or blocking the message including the URL, and/or the URL and all associated URLS, and/or adding the URL to a URL block list.

In one embodiment, if, the URL redirect analysis fails to provide access to the associated web page, one or more further analysis actions are taken such as, but not limited to: checking on the hostname of the of the destination URL to see if it contains spam-related words or phrases, or follows any defined pattern, or specific format, known to be used by spammers; checking if the redirect domain exists in various URL block lists; and any other further analysis as discussed herein, and/or as known in the art at the time of filing, and/or as developed after the time of filing. In one embodiment, if the further analysis actions reveal potential spam, one or more protective actions are taken, as discussed herein, and/or as known in the art at the time of filing, and/or as developed after the time of filing. In one embodiment, if the further analysis actions fail to yield any reliable results, no further action is taken.

Using process for automatically obtaining web page content in the presence of redirects 300, spam messages, and spam URLs included in spam messages, can be efficiently and reliably identified even in the presence of multi-layered redirects, frames, DOM manipulation, tracking bugs, and incorrect HTTP status codes, and while avoiding pitfalls associated with redirect loops such as extremely long chains of redirects and tar-pitting.

In addition, using one embodiment of process for automatically obtaining web page content in the presence of redirects 300, multiple types of redirects, and issues, in a single URL string can be addressed using the relevant redirect processing procedures specific to the types of redirects, and/or issues, detected.

Consequently, using process for automatically obtaining web page content in the presence of redirects 300, far more spam messages can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "classifying", "comparing", "defining", "detecting", "determining", "distributing", "encrypting", "extracting", "filtering", "generating", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A non-transitory computer readable storage medium having stored thereon computer executable instructions that, when executed by a computer system, cause the computer system to perform a method for automatically obtaining web page content in the presence of redirects, comprising:

receiving a message addressed to a user computing system, the message including a Uniform Resource Locator (URL);

extracting the URL from the message and label the extracted URL as an original URL extracted from the message;

activating the original URL, thereby causing a browser to send a Hypertext Transfer Protocol (HTTP) request for a web page associated with the original URL and a server to send an HTTP request response associated with the original URL, the HTTP request response associated with the original URL including a header and content;

analyzing the HTTP request response header and content associated with the original URL to determine if the original URL results in a redirect or includes one or more access issues;

determining whether the original URL results in a redirect, wherein the redirect is classified by type and is either standard or interstitial;

accessing the web page associated with the original URL upon determining that the original URL does not result in a redirect;

associating the original URL with spam without further processing upon determining that activation of the original URL results in a redirect that further comprises an interstitial page redirect from the server;

applying a URL redirect analysis process, the URL redirect analysis process applying a redirect processing procedure selected based on the type of redirect or other access issue associated with a URL upon determining that the original URL results in a standard redirect or includes one or more access issues;

associating a new URL generated by the URL redirect analysis process with the original URL and accessing the web page upon determining that, as a result of the URL redirect analysis process, access to a web page is obtained; and re-applying the URL redirect analysis process to all additional new URLs, or access issues, until either, as a result of an application of the URL redirect analysis process, access to a web page is obtained, or until a timeout period, or timeout iteration count, has been exceeded upon determining that, as a result of the URL redirect analysis process, the new URL also results in a redirect to an additional new URL, or includes one or more access issues.

2. The non-transitory computer readable storage medium of claim 1, wherein the message is an e-mail.

3. The non-transitory computer readable storage medium of claim 1, wherein the message is a Short Message Service (SMS), Instant Message (IM), or other text message or image.

4. The non-transitory computer readable storage medium of claim 1, wherein the URL redirect analysis process automatically determines a type of redirect, or access issue, associated with a URL selected from the group of redirects and access issues consisting of:
a Meta redirect;
a JavaScript (JS) redirect;
the presence of frames;
the presence of Document Object Model (DOM) manipulation; and
an incorrectly used HTTP status code.

5. The non-transitory computer readable storage medium of claim 1, wherein the URL redirect analysis process includes two or more redirect processing procedures selected from the group of redirect processing procedures consisting of:
a Meta redirect processing procedure;
a JavaScript (JS) redirect processing procedure;
a frames redirect processing procedure;
a DOM manipulation redirect processing procedure; and
an incorrectly used HTTP status codes redirect processing procedure.

6. The non-transitory computer readable storage medium of claim 1, wherein the URL redirect analysis process includes:
a Meta redirect processing procedure;
a JavaScript (JS) redirect processing procedure;
a frames redirect processing procedure;
a DOM manipulation redirect processing procedure; and
an incorrectly used HTTP status codes redirect processing procedure.

7. The non-transitory computer readable storage medium of claim 1, wherein the method for automatically obtaining web page content in the presence of redirects further comprises:
taking one or more further analysis actions upon determining that if access to a web page is not obtained using the URL redirect analysis process before a timeout period, or timeout iteration count, has been exceeded; and
taking protective action upon determining that the one or more further analysis actions do not yield reliable results, the protective action being selected from the group of protective actions consisting of:
transforming the status of the original URL and the message including the original URL to a status of spam or potential spam;
blocking the message including the original URL;
blocking the original URL and any associated new URLs; and
adding the URL and any associated new URLs to a URL block list.

8. A method for automatically obtaining web page content in the presence of redirects comprising:
receiving a message addressed to a user computing system, the message including a Uniform Resource Locator (URL);
extracting the URL from the message and labeling the extracted URL as an original URL extracted from the message;
activating the original URL, thereby causing a browser to send a Hypertext Transfer Protocol (HTTP) request for a web page associated with the original URL and a server to send an HTTP request response associated with the original URL, the HTTP request response associated with the original URL including a header and content;
automatically analyzing the HTTP request response header and content associated with the original URL to determine if the original URL results in a redirector includes one or more access issues;
determining whether the original URL results in a redirect, wherein the redirect is classified by type and is either standard or interstitial;
accessing the web page associated with the original URL upon determining that the original URL does not result in a redirect;
associating the original URL with spam without further processing upon determining that activation of the original URL results in a redirect that further comprises an interstitial page redirect from the server;
applying a URL redirect analysis process including a redirect processing procedure selected based on the type of redirect, or other access issue, associated with the a URL upon determining that the original URL results in a standard redirect or includes one or more access issues;
associating a new URL generated by the URL redirect analysis process with the original URL and accessing the web page upon determining that as a result of the URL redirect analysis process, access to a web page is obtained; and re-applying the URL redirect analysis process to all additional new URLs, or access issues, until either, as a result of an application of the URL redirect analysis process, access to a web page is obtained, or until a timeout period, or timeout iteration count, has been exceeded upon determining that, as a result of the URL redirect analysis process, the new URL also results in a redirect to an additional new URL, or includes one or more access issues.

9. The method for automatically obtaining web page content in the presence of redirects of claim 8, wherein the message is an e-mail.

10. The method for automatically obtaining web page content in the presence of redirects of claim 8, wherein the message is a Short Message Service (SMS), Instant Message (IM), or other text message or image.

11. The method for automatically obtaining web page content in the presence of redirects of claim 8, wherein the URL redirect analysis process automatically determines a type of redirect, or access issue, associated with a URL selected from the group of redirects and access issues consisting of:
a Meta redirect;
a JavaScript (JS) redirect;
the presence of frames;
the presence of Document Object Model (DOM) manipulation; and
an incorrectly used HTTP status code.

12. The method for automatically obtaining web page content in the presence of redirects of claim 8, wherein the URL redirect analysis process includes two or more redirect processing procedures selected from the group of redirect processing procedures consisting of:
a Meta redirect processing procedure;
a JavaScript (JS) redirect processing procedure;
a frames redirect processing procedure;
a DOM manipulation redirect processing procedure; and
an incorrectly used HTTP status codes redirect processing procedure.

13. The method for automatically obtaining web page content presence of redirects of claim 8, wherein the URL redirect analysis process includes:
a Meta redirect processing procedure;
a JavaScript (JS) redirect processing procedure;
a frames redirect processing procedure;
a DOM manipulation redirect processing procedure; and
an incorrectly used HTTP status codes redirect processing procedure.

14. The method for automatically obtaining web page content in the presence of redirects of claim 8, further comprising:
taking one or more further analysis actions upon determining that access to a web page is not obtained using the URL redirect analysis process before a timeout period, or timeout iteration count, has been exceeded; and
taking protective action upon determining that if the one or more further analysis actions do not yield reliable results, the protective action being selected from the group of protective actions consisting of:
transforming the status of the original URL and the message including the original URL to a status of spam or potential spam;
blocking the message including the original URL;
blocking the original URL and any associated new URLs; and
adding the URL and any associated new URLs to a URL block list.

15. A system for automatically obtaining web page content in the presence of redirects comprising:
a user computing system;
a link following computing system;
a URL analysis process implemented on the link following computing system;
a URL redirect analysis process implemented on the link following computing system;
a message directed to the user computing system; and
one or more processors associated with one or more computing systems, the one or more processors implementing a process for automatically obtaining web page content in the presence of redirects, the process for automatically obtaining web page content in the presence of redirects comprising:
receiving the message directed to the user computing system at the link following computing system, the message including a Uniform Resource Locator (URL);
using the one or more processors associated with one or more computing systems to extract the URL from the message and label the extracted URL as an original URL extracted from the message;
using the one or more processors associated with one or more computing systems to transfer the extracted original URL to the URL analysis process;
executing the URL analysis process; and
executing the URL redirect analysis process;
wherein the URL analysis process comprises:
activating the original URL, thereby causing a browser to send a Hypertext Transfer Protocol (HTTP) request for a web page associated with the original URL and a server to send an HTTP request response associated with the original URL, the HTTP request response associated with the original URL including a header and content;
analyzing the HTTP request response header and content associated with the original URL to determine if the original URL results in a redirect, or includes one or more access issues, the process being configured to at least determine whether activation of the original URL results in an interstitial page a redirect, wherein the redirect is classified by type and is either standard or interstitial;
accessing the web page associated with the original URL upon determining that the original URL does not result in a redirect;
associating the original URL with spam without further processing upon determining that activation of the original URL results redirect that further comprises an interstitial page redirect from the server; and
transferring the original URL to the URL redirect analysis process upon determining that the original URL results in a standard redirect, or includes one or more access issues;
wherein the URL redirect analysis process comprises:
automatically determining the type of redirect, or access issue, associated with the original URL;
selectively applying one or more of the redirect processing procedures based on the type of redirect, or access issue, associated with the original URL;
associating a new URL with the original URL and access the web page upon determining that, as a result of the URL redirect analysis process, access to a web page is obtained; and re-applying the URL redirect analysis process to all additional new URLs, or access issues, until either, as a result of an application of the URL redirect analysis process, access to a web page is obtained, or until a timeout period, or timeout iteration count, has been exceeded upon determining that as a result of the URL redirect analysis process, it is determined the new URL also results in a redirect to an additional new URL, or includes one or more access issues.

16. The system for automatically obtaining web page content in the presence of redirects of claim 15, wherein the message is a message type selected from the group of message types consisting of:
    an e-mail message;
    a Short Message Service (SMS) message;
    any text message;
    an Instant Message (IM); and
    an image.

17. The system for automatically obtaining web page content in the presence of redirects of claim 15, wherein the URL redirect analysis process automatically determines a type of redirect, or access issue, associated with a URL selected from the group of redirects and access issues consisting of:
    a Meta redirect;
    a JavaScript (JS) redirect;
    the presence of frames;
    the presence of Document Object Model (DOM) manipulation; and
    an incorrectly used HTTP status code.

18. The system for automatically obtaining web page content in the presence of redirects of claim 15, wherein the URL redirect analysis process includes two or more redirect processing procedures selected from the group of redirect processing procedures consisting of:
    a Meta redirect processing procedure;
    a JavaScript (JS) redirect processing procedure;
    a frames redirect processing procedure;
    a DOM manipulation redirect processing procedure; and
    an incorrectly used HTTP status codes redirect processing procedure.

19. The system for automatically obtaining web page content in the presence of redirects of claim 15, wherein the URL redirect analysis process includes:
    a Meta redirect processing procedure;
    a JavaScript (JS) redirect processing procedure;
    a frames redirect processing procedure;
    a DOM manipulation redirect processing procedure; and
    an incorrectly used HTTP status codes redirect processing procedure.

20. The system for automatically obtaining web page content in the presence of redirects of claim 15, wherein the process further comprises:
    taking one or more further analysis actions upon determining that if access to a web page is not obtained using the URL redirect analysis process before a timeout period, or timeout iteration count, has been exceeded; and
    taking protective action upon determining that if the one or more further analysis actions do not yield reliable results, the protective action being selected from the group of protective actions consisting of:
    transforming the status of the original URL and the message including the original URL to a status of spam or potential spam;
    blocking the message including the original URL;
    blocking the original URL and any associated new URLs; and
    adding the URL and any associated new URLs to a URL block list.

* * * * *